United States Patent
Feng et al.

(10) Patent No.: US 7,929,477 B2
(45) Date of Patent: Apr. 19, 2011

(54) METHOD, APPARATUS AND SYSTEM FOR DATA TRANSMISSION IN RADIO COMMUNICATION NETWORK

(75) Inventors: Shulan Feng, Shenzhen (CN); Ting Li, Shenzhen (CN); Hanfeng Zhang, Shenzhen (CN); Jingyang Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 864 days.

(21) Appl. No.: 11/842,681

(22) Filed: Aug. 21, 2007

(65) Prior Publication Data

US 2008/0049657 A1     Feb. 28, 2008

(30) Foreign Application Priority Data

Aug. 22, 2006  (CN) .......................... 2006 1 0109910
Sep. 13, 2006  (CN) .......................... 2006 1 0154149

(51) Int. Cl.
    *H04J 3/08*    (2006.01)
    *H04B 7/14*    (2006.01)
(52) U.S. Cl. ........................................ 370/315; 370/329
(58) Field of Classification Search .................. None
    See application file for complete search history.

(56) References Cited

U.S. PATENT DOCUMENTS

| | | | |
|---|---|---|---|
| 6,912,212 | B1 | 6/2005 | Young et al. |
| 7,440,427 | B1 * | 10/2008 | Katz .............................. 370/321 |
| 2002/0176381 | A1 * | 11/2002 | Hammel et al. .............. 370/329 |
| 2005/0190729 | A1 * | 9/2005 | Roy et al. ....................... 370/336 |
| 2007/0280153 | A1 * | 12/2007 | Sinha ............................ 370/328 |
| 2008/0031181 | A1 * | 2/2008 | Tsai et al. ...................... 370/315 |
| 2008/0220790 | A1 * | 9/2008 | Cai et al. ....................... 455/450 |
| 2010/0040039 | A1 * | 2/2010 | Roy et al. ...................... 370/345 |

FOREIGN PATENT DOCUMENTS

WO   WO 2006/065036 A1   6/2006

* cited by examiner

*Primary Examiner* — Min Jung
(74) *Attorney, Agent, or Firm* — Leydig, Voit & Mayer, Ltd.

(57) ABSTRACT

The embodiments of the present invention provide a method, an apparatus and a system for data transmission, the method comprises: reusing, when the hop number of a branch in a radio communication network is greater than a predetermined hop number, resources of the predetermined hop number on links with different hop numbers in the radio communication network. The method, apparatus and system provided by the embodiments of the present invention may guarantee the real time traffic transmission of a forwarding network, improve the spectrum efficiency of the forwarding network and assure the dynamic expansion of the forwarding network.

18 Claims, 4 Drawing Sheets

METHOD, APPARATUS AND SYSTEM FOR DATA TRANSMISSION IN RADIO COMMUNICATION NETWORK

This application claims priority to Chinese Patent Application No. 200610109910.9, filed Aug. 22, 2006, and Chinese Patent Application No. 200610154149.0, filed Sep. 13, 2006, both of which are hereby incorporated by reference.

FIELD OF THE INVENTION

The present invention relates to the radio communications, and more particularly, to a method, an apparatus and a system for data transmission in a radio communication network.

BACKGROUND OF THE INVENTION

Based on different types of communication paths from a source to a sink in a radio communication system, the structure of the radio communication system may include:

a network that allows direct communication between the source and the sink, e.g., a cellular network;

a network that requires a Relay Station (RS) to forward data between the source and the sink in the communication, e.g., a relay network, Ad hoc network, multi-hop network and mesh network in the field of communication technology, and such networks are referred to as forwarding networks.

If a branch of the cellular network includes an RS, e.g., a repeater, between a source and a sink, the branch is a portion of a forwarding network. The branch is a path between the source and the sink.

In a forwarding network, an RS needs to occupy radio resources different with the radio resources occupied by the source and sink to forward data. Therefore, an appropriate data transmission mode should be set for the forwarding network to allocate radio resources properly so as to prevent system interference from increasing. In addition, when a node in the forwarding network moves, the data transmission mode should be able to be adapted to the changed network structure.

In the forwarding network, a source node is defined as a node with a hop number of 0; and along the direction from the source node to a sink node, the hop number of every newly added node increases by 1, and the hop number of the branch also increases by 1, the link between the node with a hop number of N−1 and the node with a hop number of N is the $N^{th}$ hop link. Similarly, the cellular network may also be regarded as a forwarding network with a hop number of 1.

The Fixed transmission mode is a transmission mode for the forwarding network of the related art. Specifically, the transmission mode is determined according to the maximum hop number in the forwarding network, that is, the time in a frame is divided into time slots, the number of which equals to the maximum hop number in the forwarding network, and the time slots are respectively assigned to links with different hop numbers; then, in a downlink, the source node ($0^{th}$ hop) transmits data to the nearest $1^{st}$ hop RS or Subscriber Station (SS), which, upon the receipt of the data, forwards the data to the $2^{nd}$ hop RS or SS, and the rest process is performed in the same way, until the data reaches the sink node. The transmission process on the uplink is opposite to the process on the downlink.

The fixed transmission mode is easy to control and, since a complete transmission process, including the data transmission from the source node to the sink node and the response from the sink node to the source node, may be finished in one frame, the fixed transmission mode limits the traffic delay in the time of one frame.

However, the inventor finds that the disadvantages of the fixed transmission mode include: low spectrum effectiveness, because only one entity with a certain hop number transmits data in the whole forwarding network at a time so that the space resources of the forwarding network cannot be fully utilized; and incapable of adjusting the data transmission scheme when the maximum hop number of the forwarding network changes, because the frame structure of the data limits the maximum hop number of the forwarding network.

The Dynamic transmission mode is another transmission mode for the forwarding network of the related art. The dynamic transmission mode does not limit the hop number of the forwarding network and transmits the data of one hop in one frame. In the dynamic transmission mode, the time and spectrum resources may be reused, therefore the space resources of the forwarding network may be fully utilized and the spectrum effectiveness is high; in addition, the dynamic transmission mode is able to be adapted to the changed network structure and thus guarantees the free expansion of the network.

However, the inventor finds that the disadvantage of the dynamic transmission mode includes a long traffic delay in the forwarding network.

SUMMARY OF THE INVENTION

The present invention provides a method, an apparatus and a system for data transmission in a radio communication network, which guarantee the real-time traffic transmission of a forwarding network, improve the spectrum effectiveness of the forwarding network and assure the dynamic expansion of the forwarding network.

A method for data transmission in a radio communication network comprises the following processes:

reusing, when the hop number of a branch in a radio communication network is greater than a predetermined hop number, resources of the predetermined hop number on links with different hop numbers in the radio communication network.

A method for data transmission in a radio communication network comprises the following processes:

when a predetermined hop number in a radio communication network equals to 2, using the resources of the first hop number in the predetermined hop number on an odd link of the radio communication network to transmit data, and using the resources of the second hop number in the predetermined hop number on an even link of the radio communication network to transmit data.

An apparatus for data transmission in a radio communication network is configured to:

reuse, when the hop number of a branch in a radio communication network is greater than a predetermined hop number, resources of the predetermined hop number on links with different hop numbers in the radio communication network.

An apparatus for data transmission in a radio communication network is configured to:

when a predetermined hop number in a radio communication network equals to 2, allocate the resources of the first hop number in the predetermined hop number to an apparatus with an odd hop number to transmit data, and allocate the resources of the second hop number in the predetermined hop number to an apparatus with an even hop number to transmit data.

A system for data transmission in a radio communication network comprises:

a first apparatus, configured to, when the hop number of a branch in a radio communication network is greater than a predetermined hop number, allocate resources of the predetermined hop number to links with different hop numbers in the radio communication network, and reuse the resources of the predetermined hop number on links with different hop numbers in the radio communication network to transmit data;

a second apparatus, configured to use resources of the predetermined hop number allocated by the first apparatus to transmit data to another second apparatus and/or the first apparatus.

In accordance with an embodiment of the present invention, by reusing the resources of the predetermined hop number on the links with different hop numbers, the real-time transmission of traffic in a forwarding network (especially in a mobile forwarding network) is guaranteed, the spectrum effectiveness of the forwarding network is improved and the dynamic expansion of the forwarding network is guaranteed. Hence certain embodiments of the present invention may effectively solve the problems in a forwarding network including traffic delay, low spectrum effectiveness and poor adaptability to the change of the network structure information.

DETAILED DESCRIPTION OF THE PREFERRED EMBODIMENTS

Certain embodiments of the present invention provide a method, an apparatus and a system for data transmission in a radio communication system, which comprises: setting up a basic frame and a data transmission scheme according to the network structure information and other factors, reusing the basic frame and adjusting the data transmission scheme according to the change of the network structure information monitored in real time.

Figure 1:
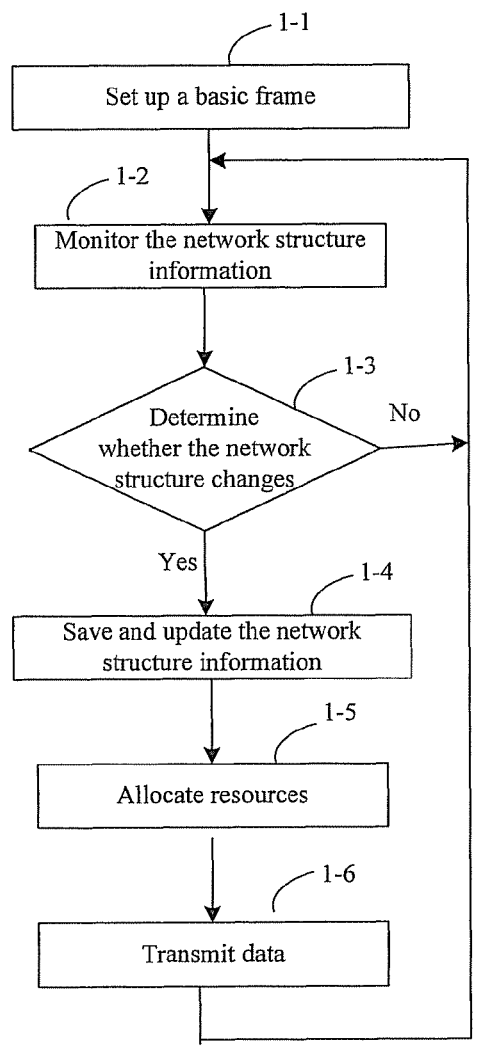
FIG. 1 is a simplified flowchart illustrating a method for data transmission in accordance with an embodiment of the present invention.

The embodiments of the present invention are hereinafter described in detail with reference to the accompanying drawings. As shown in FIG. 1, specific procedures of the method in accordance with an embodiment of the present invention comprise the following steps.

Step 1-1: Set Up a Basic Frame for Data Transmission in a Radio Communication Network.

First of all, in the present embodiment, it is needed to set up a basic frame for the data transmission in the radio communication network, and the basic frame may allow a certain hop number (defined as hop factor n). When the basic frame is set up, an appropriate hop factor n, i.e. hop number allowed in the basic frame, may be determined based on the branch hop number probability distribution of the radio network, the required Quality of Service (QoS) of primary traffics and the change characteristics of the network structure.

Figure 2:
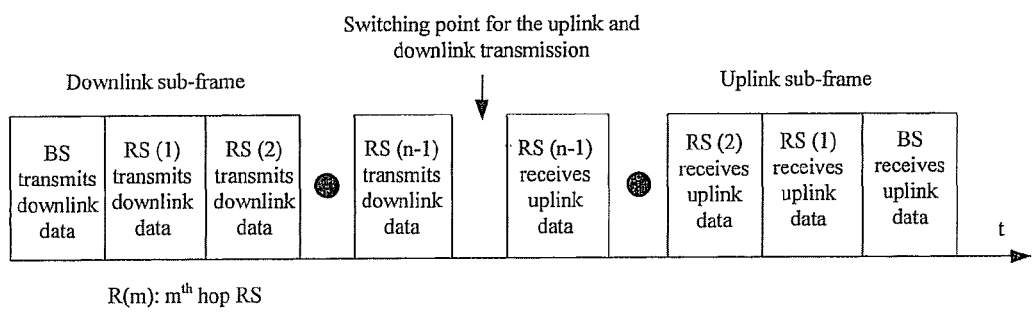
FIG. 2 is a simplified schematic diagram of a time division basic frame in the Time Division Duplex (TDD) mode in accordance with an embodiment of the present invention.

The basic frame may adopt a time division structure, a frequency division structure, a code division structure, a time division and frequency division mixed structure, a time division and code division mixed structure, a frequency division and code division mixed structure, a time division, frequency division and code division mixed structure, or other structures to ensure the data transmission on links with different hop numbers. FIG. 2 is a simplified schematic diagram illustrating a time division basic frame in a TDD mode. On a downlink, a Base Station (BS) ($0^{th}$ hop) transmits data to the nearest $1^{st}$ hop RS or SS, which, upon the receipt of the data, forwards the data to the $2^{nd}$ hop RS or SS, and the rest process is performed in the same way, until the data reaches the sink node. The transmission process on an uplink is opposite to the process on the downlink.

Figure 3:
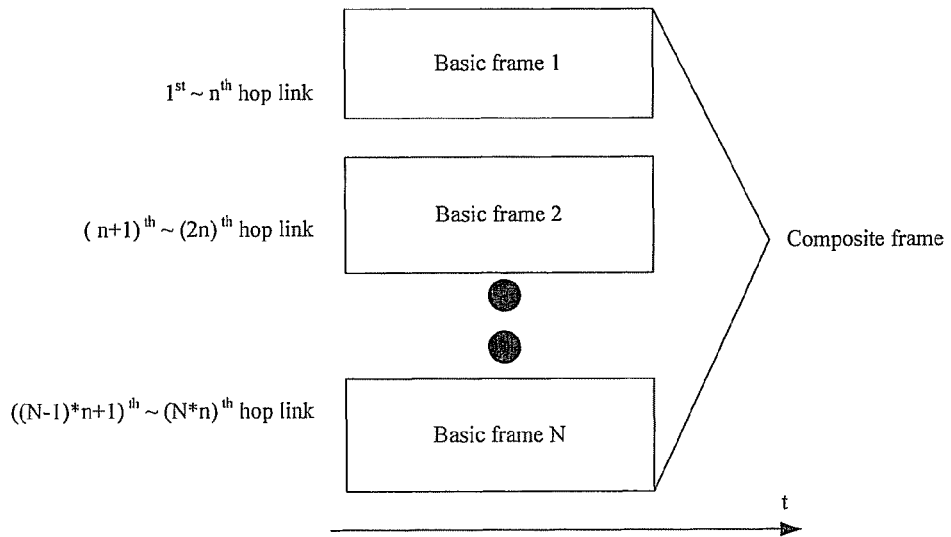
FIG. 3 is a simplified schematic diagram illustrating a composite frame structure in accordance with an embodiment of the present invention.

When the maximum hop number of the radio communication network is less than or equal to the hop number allowed in the basic frame, the transmission delay of the traffic in the radio communication network is limited in one frame; and when the maximum hop number of the radio communication network is greater than the hop number allowed in the basic frame, the radio communication network reuses the basic frame in different space to form a composite frame, as shown in FIG. 3. In the composite frame structure, the maximum link hop number is greater than the hop number allowed in the basic frame, therefore the $(n*N+1)^{th}$ ($N=1, 2, \ldots$) hop link may reuse the radio resources occupied by the $1^{st}$ hop link in different space, the $(n*N)+2)^{th}$ hop link may reuse the radio resources occupied by the $2^{nd}$ hop link in different space, and the rest can be deduced by analogy. Herein, the "N" represents the number of reuse times.

The basic frame may be set up by a control node in the radio communication network.

Step 1-2: Monitor the Network Structure Information.

The control node and normal nodes in the radio communication network have to monitor corresponding network structure information in real time.

The control node in the radio communication network has to monitor the network structure information of the whole network in real time, e.g., monitor whether the network structure changes because of the adding of a new node, moving of an existing node, node status change or powering off of a node, and monitor the node number, node sequence and the information of neighboring nodes of each node in all branches of the radio communication network. A normal node in the radio communication network monitors only the network structure information related to the normal node itself, including the location of the normal node in the branch, the information of a upstream node and downstream node (if there is a downstream node) of the normal node, and the information of neighboring nodes of the normal node itself.

The monitoring method of the control node may include: querying normal nodes periodically, or actively reporting by the normal nodes, or indirectly querying or calculating through adjacent nodes (including neighboring, upstream and downstream nodes) of the normal nodes; the monitoring method of a normal node may include: directly accessing the structure information which has already been queried or calculated by the system for the normal node, or calculating, based on the information of adjacent nodes (including the upstream, downstream and neighboring nodes), to obtain the structure information of the normal node.

Step 1-3: Determine Whether the Network Structure Changes According to the Information Obtained by Monitoring.

The control node and normal nodes determine whether the network structure changes according to the information obtained by monitoring. If the network structure does not change, Step 1-2 is performed, i.e., the control node and normal nodes continue to monitor corresponding network structure information; otherwise, Step 1-4 is performed.

Step 1-4: Save and Update the Network Structure Information.

When the control node or normal nodes detect that the network structure changes, the information on the network structure change should be reported to a corresponding network structure information database.

The network structure information database of the control node saves the existing network structure information of the whole network and updates the network structure information in real time. In addition, the network structure information may include the updated records in a certain period of time, e.g., the structure information of a node before and after a handover.

The network structure information database of a normal node saves the existing network structure information in the normal node itself and updates the network structure information in real time. The network structure information may also include the updated records in a certain period of time.

Step 1-5: Allocate Resources.

The control node of the radio communication network has to allocate proper resources to links with different hop numbers on different branches in the whole network according to the network structure information of the whole network saved in the network structure information database of the control node.

When the hop number of a branch in the radio communication network is less than or equal to a predetermined hop number, i.e. the hop number allowed in the basic frame, the control node of the radio communication network allocates transmission resources of different hop numbers in the basic frame to links with different hop numbers on the branch.

When the hop number of a branch in the radio communication network is greater than the predetermined hop number allowed in the basic frame, the branch reuses the basic frame in different space and the control node of the radio communication network allocates transmission resources of different hop numbers in different basic frames to links with different hop numbers on the branch. Furthermore, in order to reduce the interference brought by reusing the basic frame in different space, the transmission resources of the same hop numbers in different basic frames may be allocated to the links with the hop numbers which are congruent to each other modulo n (e.g., the $1^{st}$ hop link and the $(n+1)^{th}$ hop link). The "n" herein means the hop number allowed in the basic frame.

The control node of the radio communication network allocates resources of the same hop number in the basic frame to links with the same hop number on different branches in the radio communication network. To avoid the interference from increasing, the control node of the radio communication network may also allocate different resources of the same hop number in the basic frame to links with the same hop number on different branches in the radio communication network.

The control node of the radio communication network adjusts the data transmission scheme (e.g., the resources allocated to the links with different hop numbers) in real time according to the network structure information of the whole network saved in the network structure information database of the control node so that the data transmission scheme is adapted to the network structure change.

A normal node in the radio communication network allocates resources to different traffic flows on the normal node according to the structure information of the normal nodes itself in the network structure databases of the normal node.

Step 1-6: Transmit Data.

The control node of the radio communication network receives and transmits data to and from normal nodes with the allocated resources based on the basic frame set in advance.

A normal node of the radio communication network receives and transmits data to and from other normal nodes and/or the control node with the resources allocated by the control node and the normal node based on the basic frame set in advance.

Figure 4:
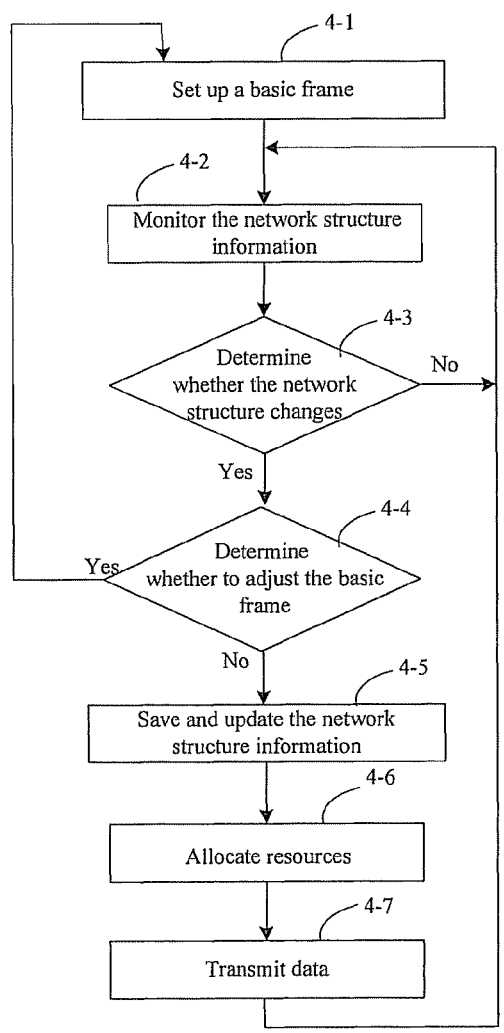
FIG. 4 is a simplified flow chart illustrating a method for data transmission in which a basic frame is adjusted in accordance with an embodiment of the present invention.

In practical applications, the foregoing process may be improved by adding the step of adjusting the basic frame, as shown in FIG. 4. In view of FIG. 1, Step 4-1 to Step 4-3 in FIG. 4 are the same as Step 1-1 to Step 1-3, Step 4-5 to Step 4-7 in FIG. 4 are the same as Step 1-4 to Step 1-6, and an extra step of adjusting the basic frame are included in FIG. 4. In the procedure shown in FIG. 4, when monitoring the network structure information, if control node detects large network structure change or a traffic demand emerges, the basic frame needs to be adjusted, hence the control node resets up the basic frame, reducing or increasing the hop numbers allowed in the basic frame, or adjusting the transmission resources occupied by each or some links with specific hop number. Then the control node continues to monitor the network structure information of the whole network.

Figure 5:
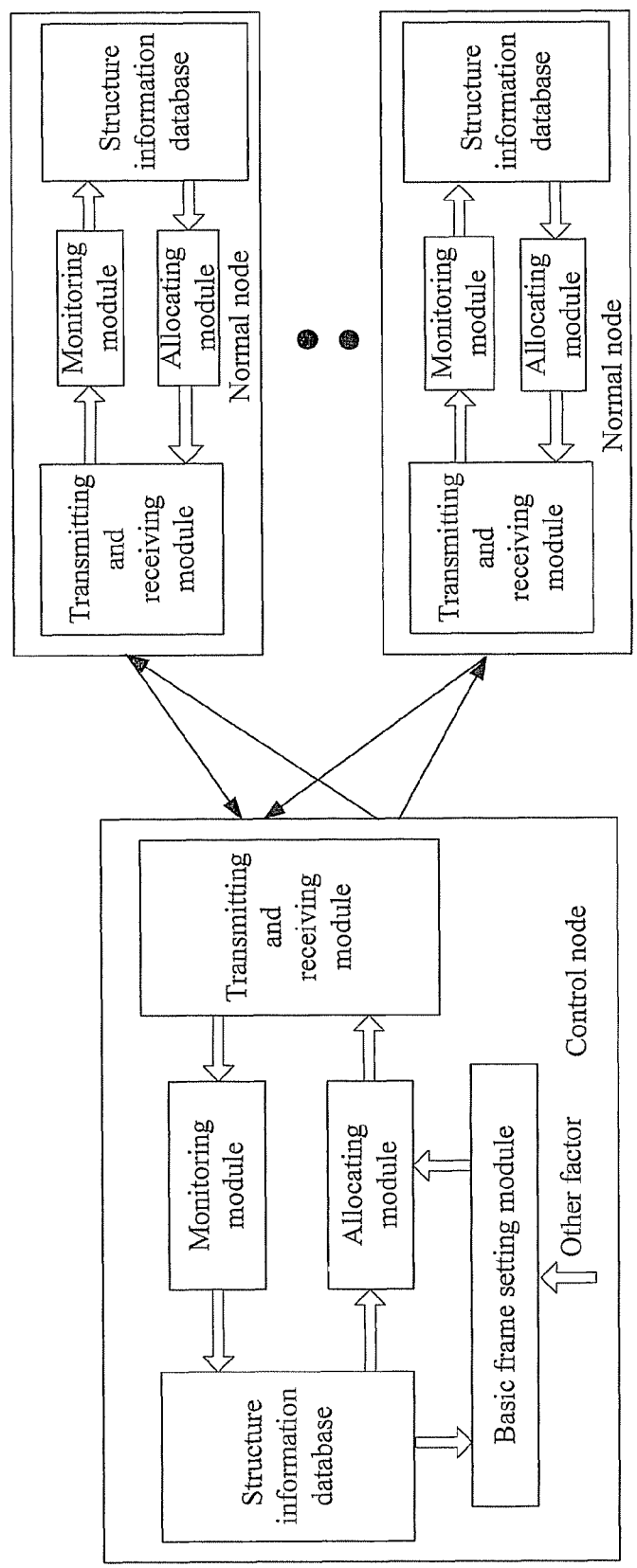
FIG. 5 is a simplified schematic diagram illustrating the structure of a system in accordance with an embodiment of the present invention.

A system in accordance with the above method comprises one or more control nodes and one or more normal nodes, in which one control node may correspond to multiple normal nodes. A structure of the system in accordance with an embodiment is shown in FIG. 5, comprising a control node and multiple normal nodes.

The control node includes a monitoring module, a structure information database, an allocating module, a transmitting and receiving module and a basic frame setting module. The functions of the modules are given in the following description.

The monitoring module monitors the network structure information of the whole network in real time and transmits the network structure information obtained by monitoring to the structure information database. When it is determined that the network structure changes according to the network structure information obtained by monitoring, corresponding information on the network structure change is transmitted to the structure information database.

The structure information database updates and saves the network structure information of the whole network based on the network structure information and the information on the network structure change from the monitoring module.

The allocating module allocates resources to links with different hop numbers in the radio communication network according to the basic frame and based on the network structure information of the whole network saved in the structure information database, and adjusts the allocated resources on demand.

The transmitting and receiving module transmits and receives data, based on the basic frame, to and from normal nodes or other control nodes with the resources allocated by the allocating module.

The basic frame setting module sets up the basic frame for data transmission in the whole network according to the network structure information of the whole network in the structure information database, and adjusts the basic frame so that the basic frame is reconstructed when large network structure change is detected or when a traffic demand emerges.

A normal node includes a monitoring module, a structure information database, an allocating module and a transmitting and receiving module. The functions of the modules are given in the following description.

The monitoring module monitors the structure information related to the normal node and transmits the structure information obtained by monitoring to the structure information database. When it is determined that the network structure related to the normal node changes according to the structure information obtained by monitoring, corresponding information on the network structure change is transmitted to the structure information database.

The structure information database updates and saves the structure information related to the normal node based on the structure information and the information on the network structure change from the monitoring module.

The allocating module allocates transmission resources to different traffic flows on the normal node according to the structure information related to the normal node in the structure information database.

The transmitting and receiving module transmits and receives data, based on the basic frame, to and from other normal nodes and/or the control node with the resources allocated by the allocate module of the control node and the allocate module of the normal node itself.

The radio communication network in the method and system provided by the embodiments of the present invention includes a radio forwarding network, e.g., a multi-hop network.

The present invention also provides an embodiment of the above method, i.e., the application of the method in a multi-hop network. The embodiment includes the following steps.

Set up a basic frame.

In a multi-hop network, a base station serves as a control node, and a relay station and mobile terminal serve as normal nodes.

Figure 6:
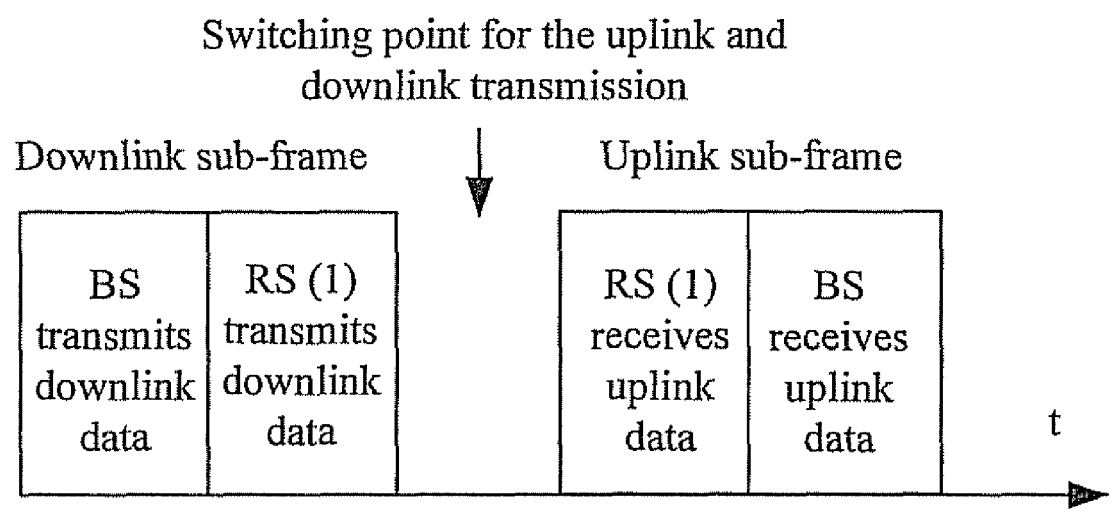
FIG. 6 is a simplified schematic diagram illustrating a basic frame in a multi-hop network in accordance with an embodiment of the present invention.

In practical applications, 2 hops are popular. With spectrum effectiveness and traffic delay considered, a basic frame of a multi-hop network is shown in FIG. 6. The basic frame allows 2 hops, and when the hop number is greater than 2, reusing resources in different space is adopted in the transmission scheme, i.e., links with odd hop numbers reuse transmission resources of the $1^{st}$ hop link and the links with even hop numbers reuse transmission resources of the $2^{nd}$ hop link. On a downlink, the base station ($0^{th}$ hop) transmits data to the $1^{st}$ hop relay station. On an uplink, the $1^{st}$ hop relay station transmits data to the base station.

The basic frame of the multi-hop network may be set up by the allocating module of the base station.

The base station monitors the network structure and obtains the location information of any new node.

The network structure of the multi-hop network may change because: a new relay station/mobile terminal is added into the system (including status update), a relay station/mobile terminal performs handover, the status of a relay station/mobile terminal changes (some transmission resources are no long needed in the normal operation), or a relay station/mobile terminal leaves the network. When a new relay station/mobile terminal is added into the system or an existing relay station/mobile terminal performs handover, the relay station/mobile terminal accesses a service or broadcast information from the serving or target relay station/base station to learn the location information of the relay station/mobile terminal, and the base station may obtain the location information of the relay station/mobile terminal through the report from the relay station/mobile terminal or from the serving relay station/base station of the relay station/mobile terminal, and thus obtain network the structure information of the whole network. When the status of a relay station/mobile terminal changes or a relay station/mobile terminal leaves the network, the relay station/mobile terminal sends a status change or requesting leave signaling and the base station may learns the network structure information after the relay station/mobile terminal leaves.

In this way the base station in the multi-hop network may obtain the network structure information of the whole network in real time and saves the network structure information in the network structure information database of the base station.

The allocating module in the base station accesses the network structure information in the network structure database and allocates the resources, and the base station provides, through the broadcast information on the downlink, the information on the resources allocated to a new relay station/mobile terminal or the relay station/mobile terminal after handover.

When the base station detects that the network structure of the whole network changes to a great extent, or an important factor such as another traffic demand emerges, the allocating module of the base station may also adjust the basic frame. However, in normal applications, for the sake of easy control over the system, the basic frame should not be changed indiscreetly.

The relay station/mobile terminal accesses the information on the resource allocated to the relay station/mobile terminal on the downlink and transmits uplink and downlink data over allocated radio link.

The foregoing is only preferred embodiments of this invention. The protection scope of this invention, however, is not limited to the above description. Any change or substitution, within the technical scope disclosed by this invention, easily occurring to those skilled in the art should be covered by the protection scope of this invention. Therefore, the protection scope of the present invention should be determined according to claims.

What is claimed is:

1. A method for data transmission in a radio communication network in which a branch between a source and a sink comprises a number of nodes and each node is designated by a hop number, comprising:
    setting up a basic frame for the data transmission, wherein the basic frame comprises a number of subframes;
    determining a hop number of the branch;
    allocating, consecutively, a transmission resource in a subframe to a link of the branch starting from the link with the lowest hop number; and
    if the hop number of the branch is greater than the number of the subframes, reusing the transmission resources of the subframes by allocating, consecutively, a transmission resource in a subframe to a link of the branch starting from the link with the hop number greater than the number of the subframes until all the links are allocated with a transmission resource in a subframe;
    wherein the hop number of the branch is the number of total hops between the source and the sink, and a link with a hop number of N is a link between a node with a hop number of N−1 and a node with a hop number of N in the branch.

2. The method of claim 1, further comprising:
    setting the number of the subframes based on structure information and traffic demand of the radio communication network.

3. The method of claim 2, further comprising:
monitoring the structure information and the traffic demand of the radio communication network in real time, and
saving and updating the structure information and the traffic demand.

4. The method of claim 2, further comprising:
adjusting the number of the subframes when the structure information or the traffic demand of the radio communication network changes.

5. The method of claim 2, further comprising:
adjusting the resources allocated to the links with different hop numbers when the structure information or the traffic demand of the radio communication network changes.

6. The method of claim 1, wherein reusing the resources of the subframes comprises:
if the hop number of a link is less than or equal to the number of subframes, allocating the resource of a subframe to the link, so that the subframe number and the hop number of the link are the same; and
if the hop number of the link is greater than the number of subframes, allocating the resource of a subframe to the link, so that the subframe number equals the hop number of the link modulo the number of subframes.

7. The method of claim 1, further comprising:
using different resources of the same subframe on links with hop numbers which are congruent to each other modulo the predetermined hop number.

8. The method of claim 1, wherein the number of the subframes equals to 2; and
reusing the resources of the subframes comprises:
allocating resources of a first subframe to an odd link to transmit data, and allocating resources of a second subframe to an even link to transmit data.

9. The method of claim 1, further comprising:
allocating different resources of the same subframe on links with the same hop number on different branches in the radio communication network.

10. The method according to claim 1, wherein the radio communication network is a radio forwarding network.

11. A system for data transmission in a radio communication network in which a branch between a source and a sink comprises a number of nodes and each node is designated by a hop number, wherein said system comprises a first apparatus and a second apparatus;
wherein the first apparatus is configured to:
set up a basic frame for data transmission, wherein the basic frame comprises a number of subframes;
determine a hop number of the branch;
allocate, consecutively, a transmission resource in a subframe to a link of the branch starting from the link with the lowest hop number, and
when the hop number of the branch is greater than the number of subframes, reuse the transmission resources of the subframes by allocating consecutively a transmission resource in a subframe to a link of the branch starting from the link with the hop number greater than the number of the subframes until all the links are allocated with a transmission resource in a subframe; and
wherein the second apparatus is configured to use the resources of the subframes allocated by the first apparatus to transmit data;
wherein the hop number of the branch is the number of total hops between the source and the sink, and a link with a hop number of N is a link between a node with a hop number of N−1 and a node with a hop number of N in the branch.

12. The system of claim 11, wherein the first apparatus is further configured to set the number of the subframes based on structure information and traffic demand of the radio communication network, and adjusts the number of the subframes when the structure information or the traffic demand of the radio communication network changes.

13. The system of claim 11, wherein the first apparatus is further configured to set the number of the subframes based on structure information and traffic demand of the radio communication network, and adjusts the resources allocated to the links with different hop numbers when the structure information or the traffic demand of the radio communication network changes.

14. The system of claim 11, wherein the first apparatus is configured to allocate the resource of a subframe to a link;
wherein if the hop number of the link is less than or equal to the number of subframes, the subframe number and the hop number of the link are the same; and
if the hop number of the link is greater than the number of subframes, the subframe number equals to: the hop number of the link modulo the number of subframes.

15. An apparatus for data transmission in a radio communication network in which a branch between a source and a sink comprises a number of nodes and each node is designated by a hop number, wherein the apparatus comprises: an allocating module and a transmitting and receiving module;
wherein the allocating module is configured to:
set up a basic frame for data transmission, wherein the basic frame comprises a number of subframes;
determine a hop number of the branch;
allocate, consecutively, a transmission resource in a subframe to a link of the branch starting from the link with the lowest hop number, and
if the hop number of the branch is greater than the number of subframes, reuse the transmission resources of the subframes by allocating consecutively a transmission resource in a subframe to a link of the branch starting from the link with the hop number greater than the number of the subframes until all the links are allocated with a transmission resource in a subframe;
wherein the hop number of the branch is the number of total hops between the source and the sink, and a link with a hop number of N is a link between a node with a hop number of N−1 and a node with a hop number of N in the branch; and
wherein the transmitting and receiving module is configured to: transmit and receive data, to and from normal nodes or other control nodes, with the resources allocated by the allocating module.

16. The apparatus of claim 15, wherein the apparatus further comprises:
a monitoring module, configured to: monitor structure information of the radio communication network in real time and transmit the structure information of the radio communication network to a structure information database; and
the structure information database, configured to: update and save its structure information based on the structure information of the radio communication network; and
the allocating module is configured to allocate the resources to links with different hop numbers based on the structure information saved in the structure information database, and adjusts the allocated resources on demand.

17. The apparatus of claim 15, wherein the allocating module is configured to: allocate the resource of a subframe to a link;
  wherein if the hop number of the link is less than or equal to the number of subframes, the subframe number and the hop number of the link are the same; and
  if the hop number of the link is greater than the number of subframes, the subframe number equals to: the hop number of the link modulo the number of subframes.

18. The apparatus of claim 15, wherein the number of the subframes equals to 2, and
  the allocating module is configured to: allocate resources of a first subframe to an odd link to transmit data, and allocating resources of a second subframe to an even link to transmit data.

* * * * *